Dec. 10, 1957    E. G. PODOLAN    2,815,977
VEHICLE DOOR OPERATED ROOF FLIPPER PANEL
Filed Jan. 18, 1955    3 Sheets-Sheet 1

INVENTOR
Edward G. Podolan
BY
Paul Fitzpatrick
ATTORNEY

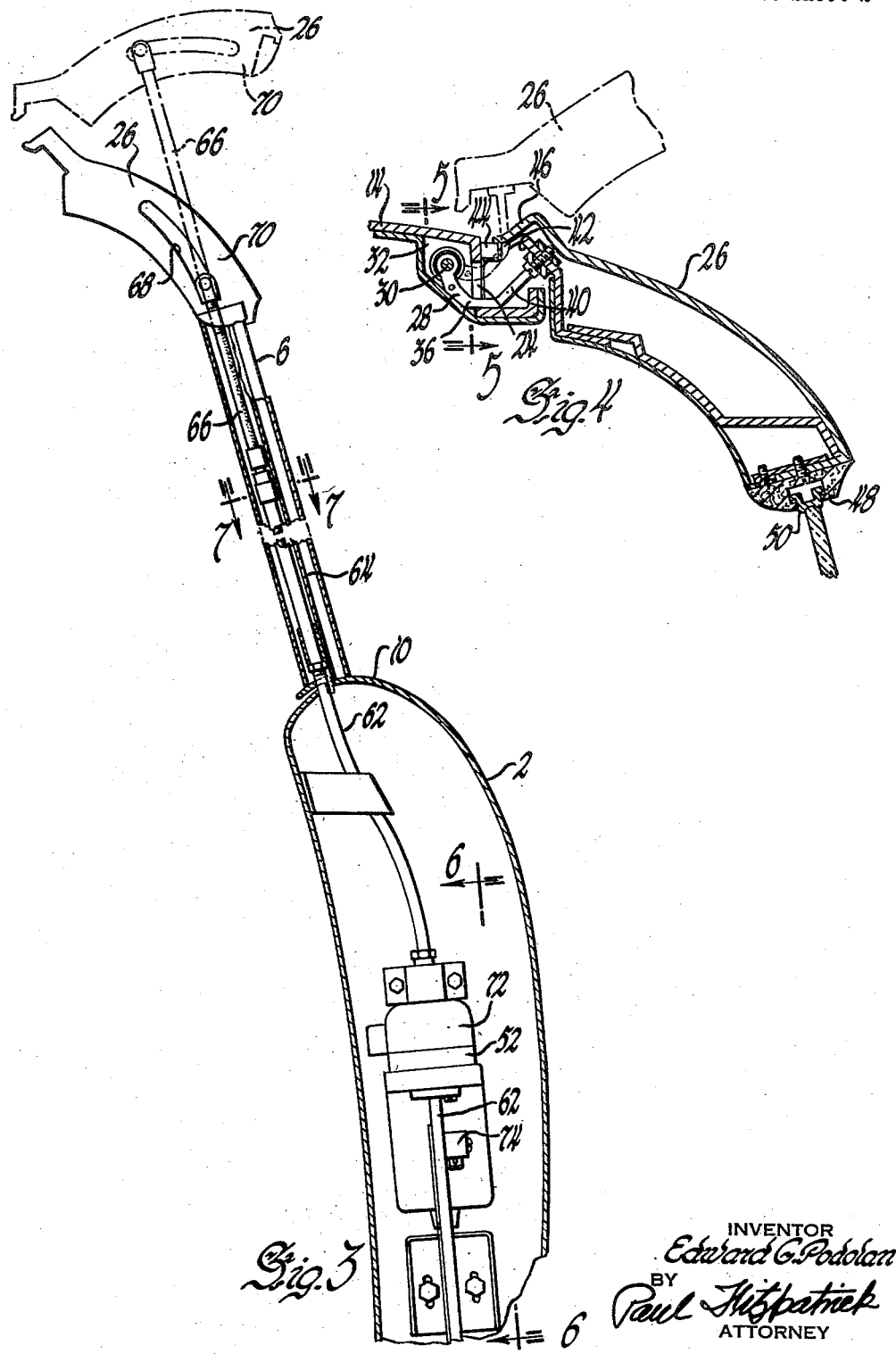

Dec. 10, 1957  E. G. PODOLAN  2,815,977
VEHICLE DOOR OPERATED ROOF FLIPPER PANEL
Filed Jan. 18, 1955  3 Sheets-Sheet 3
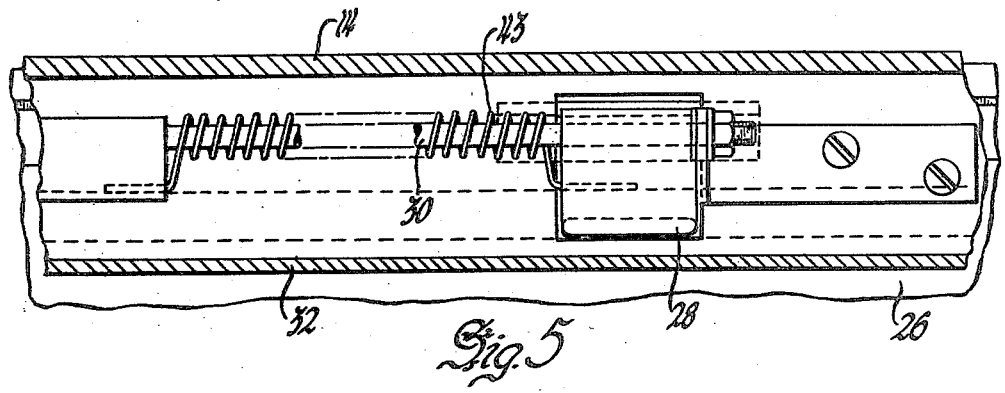
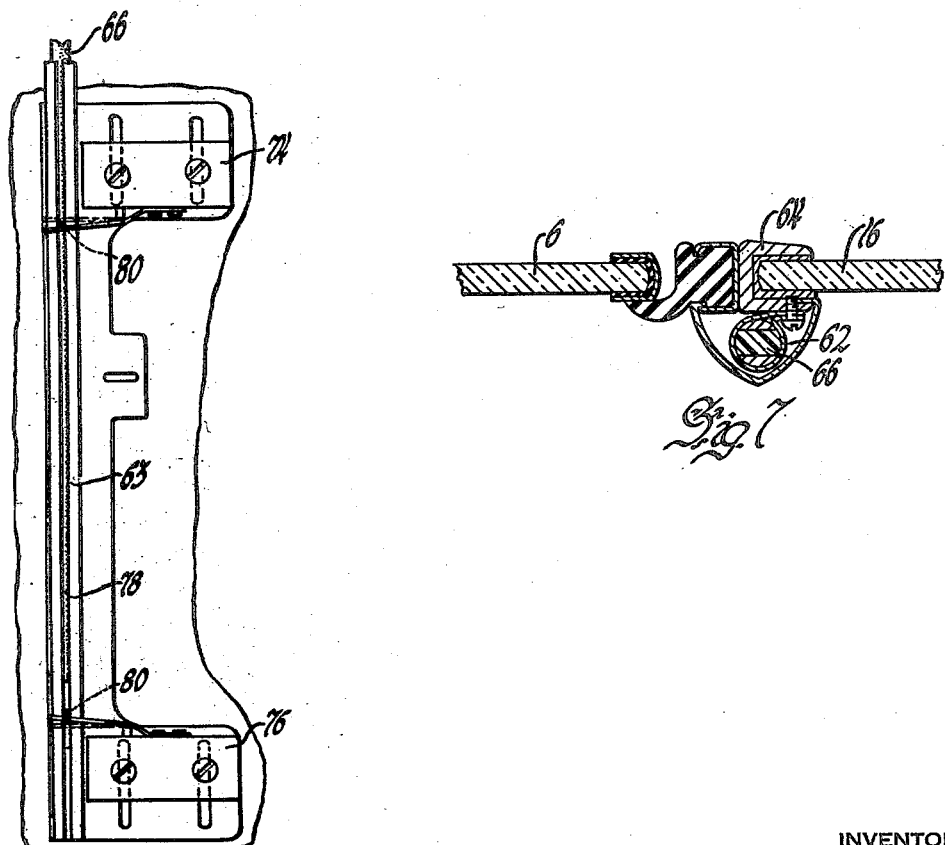
INVENTOR
Edward G. Podolan
BY
Paul Fitzpatrick
ATTORNEY

United States Patent Office 2,815,977
Patented Dec. 10, 1957

2,815,977

VEHICLE DOOR OPERATED ROOF FLIPPER PANEL

Edward G. Podolan, Detroit, Mich., assignor to General Motors Corporation, Detroit, Mich., a corporation of Delaware Application January 18, 1955, Serial No. 482,484

3 Claims. (Cl. 296—44)

This invention relates to vehicle bodies and more particularly to door constructions therefor which provide increased head room for ingress and egress from the interior of the vehicle.

In recent years, automotive design has tended toward progressively lower body silhouette. In order to accomplish the desired design characteristics, both the standing height of vehicles and the interior height of vehicle bodies has been appreciably lowered. Although in some cases actual head room or clearance between the passenger seat and the top of the vehicle has been maintained, it has nevertheless become considerably more difficult to enter and alight from such vehicles because of the low level of the top edge of door openings. Consequently, in order to enter the majority of modern vehicles, persons of average height find it necessary to stoop considerably to enter the passenger compartment.

An object of the present invention is to provide a vehicle body of low standing height having door construction affording substantially increased vertical clearance for passenger ingress and egress.

Another object is to provide in a vehicle body having outwardly swingable door structures hinged thereto on a vertical axis, movable cooperating roof panels vertically adjacent the doors, the roof panels being automatically actuated upwardly and outwardly responsive to outward swinging movement of the vehicle door.

Yet another object is to provide a structure of the type described wherein the roof panels are automatically actuated in timed relation with a normal speed of opening of a vehicle door.

Still a further object is to provide a structure of the type referred to wherein the roof panel actuating mechanism is arranged to reversibly drive the roof panel whereby the latter is swung upwardly and outwardly upon opening of the vehicle door and is retracted upon return of the vehicle door to the closed position.

These and other objects and advantages of the invention will become more fully apparent as reference is had to the accompanying specification and drawings wherein:

Fig. 3 is a rear sectional elevational view looking in the direction of arrows 3—3 of Fig. 1, certain parts being shown in dotted lines to illustrate the open and closed positions thereof.

Fig. 4 is an enlarged sectional rear elevational view looking in the direction of arrows 4—4 of Fig. 1.

Fig. 5 is an enlarged fragmentary side elevational view, partly in section, looking in the direction of arrows 5—5 of Fig. 4.

Fig. 6 is an enlarged detail view looking in the direction of arrows 6—6 of Fig. 3; and Fig. 7 is an enlarged fragmentary sectional plan view looking in the direction of arrows 7—7 of Fig. 3.

Figure 1:
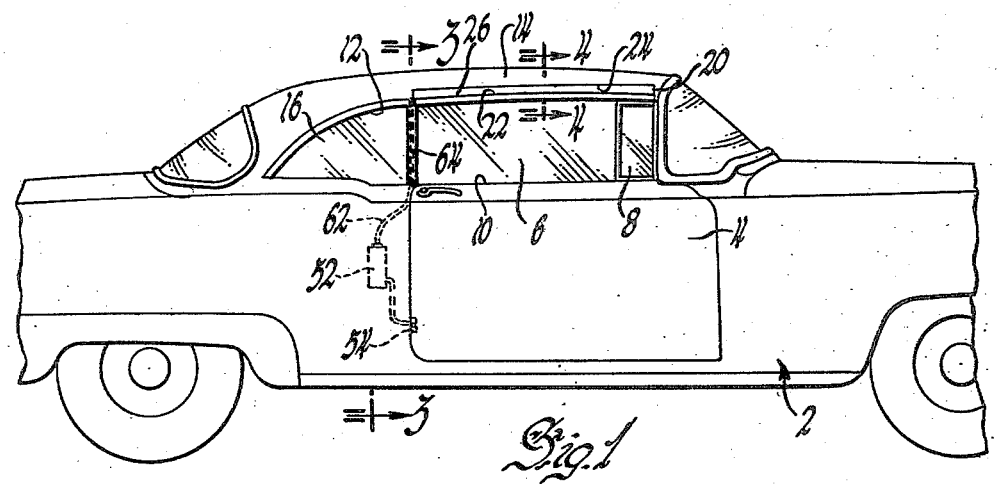
Fig. 1 is a side elevational view of an automotive vehicle illustrating the structure and arrangement of the present invention, wherein the vehicle door and hinged roof panel are shown in the normal closed position.
Figure 2:
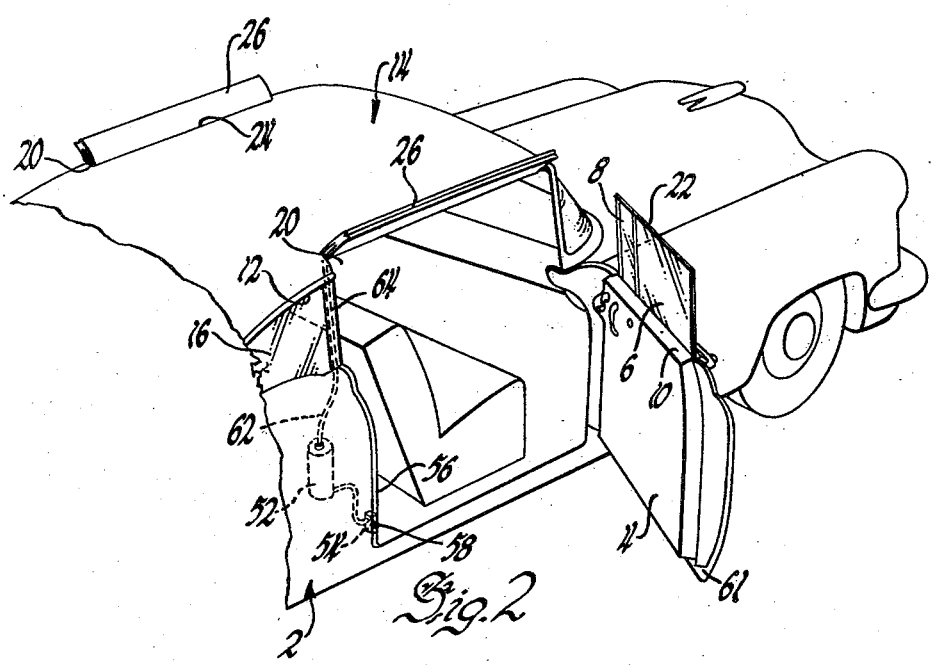
Fig. 2 is a fragmentary perspective view of the vehicle shown in Fig. 1, illustrating the position of the hinged roof panels and the vehicle doors in the open position.

Referring now to the drawings and particularly Figs. 1 and 2, there is illustrated an automotive vehicle wherein the reference numeral 2 designates generally the vehicle body. Body 2 is provided at its lateral opposite side with conventional manually operated outwardly swingable doors 4 which are hinged adjacent their forward edges on a substantially vertical axis. Doors 4 are provided with the usual vertically adjustable windows 6 and associated "Ventipane" windows 8. Windows 6 and 8 normally occupy the vertical space between the body belt line 10 and the lower longitudinally extending edge 12 forming the opposite lateral edges of the vehicle roof 14. Immediately rearwardly adjacent door windows 6, vehicle body 2 is provided with fixed rear quarter windows 16 which occupy the remaining space between belt line 10 and edges 12 of roof 14.

Since the roof panel 14 is sharply downwardly curved at the lateral opposite sides thereof for both increased structural strength and to blend with the body contour, the vertical height of the horizontal longitudinally extending edges 12 is sufficiently low as to render entrance into the interior of the vehicle very difficult. However, in accordance with one feature of the present invention, the forward side edges 12 of roof panel 14 are notched transversely inwardly to provide slots 20 which extend longitudinally adjacent the upper edge 22 of vehicle door window 6 and Ventipane 8. Slots 20 extend transversely inwardly sufficiently to provide an upper longitudinally extending margin 24, the vertical clearance of which is substantially equal to the standing height of the vehicle. Swingably mounted on a longitudinal axis in slotted portions 20 are generally rectangular roof panels 26. Panels 26 normally occupy the entire area of slots 20 and are curved in cross section as shown in Fig. 4 to conform with the cross sectional configuration of vehicle roof 14 in the area adjacent slots 20. As seen in Fig. 4, the inner edges of panels 26 are hingedly connected to roof structure 14 by means of hinge elements 28. Elements 28 are pivoted at longitudinally spaced intervals to a pivot shaft 30 carried in each of channel members 32 formed on the underside of lateral margins 24 of slots 20. Elements 28 are formed with curved intermediate portion 36 which terminates in a straight connecting portion 40. Connecting portion 40, in turn, threadably engages the upper longitudinally extending margins 42 of hinged roof panels 26. As seen in Fig. 5, spring elements 43 are provided at spaced intervals to yieldably bias panels 26 to the open position thereby substantially counter-balancing the latter and reducing the effort required to displace the same to open position. In order to prevent the entrance of rain, dust and other extraneous material between the marginal edges 24 and 42 of slots 20 and hinged panels 26, respectively, marginal edges 24 have secured thereto longitudinally extending resilient weather strips 44 which resiliently engage the terminal edges 46 of margins 24 when hinge panels 26 are in the closed position shown in Fig. 4. Similarly, the lower marignal edges 48 of panels 26 are provided with longitudinally extending weather strips 50 which resiliently engage the top edges of windows 6 and Ventipanes 8.

As seen in Fig. 2, panel 26 is arcuately swingable upwardly and outwardly in slot 20 to a vertical level above the margin 24 thereof and thus permits passenger entrance with little if any stooping such as would be required in vehicles having fixed downwardly curved roof side edges.

In order to provide automatic operation of hinged panel 26 to the raised position coincident with the opening of door 4, in accordance with another feature of the invention, there is provided a conventional power operated linear actuating mechanism 52 having pressure responsive control member 54 disposed adjacent the lower edge of the door pillar 56. Actuating mechanism 52 is generally similar in construction and operation to that shown in Fig. 1 of U. S. 2,211,858, Martin. Control member 54 is provided with a yieldable door engaging element 58 which is movable to positions effective to reversibly actuate power mechanism 52. That is, when the door 4 is closed, the lower rear edge 61 thereof displaces control 58 inwardly to a position causing actuation of power mechanism 52 in one direction and upon opening of door 4, control mechanism 58 moves outwardly to a second position causing actuation of the power mechanism 52 in the opposite direction. Control mechanism 52 has connected thereto a generally vertically directed tubular member 62, the upper end of which passes along the inner margin of U-shaped molding 64 at the forward edge of rear quarter window 16. Slidably disposed in tubular member 62 is a relatively long flexible nylon rod 66, the upper end of which pivotally engages an arcuate slot 68 formed in the rear edge 70 of hinged panel 26. Rod 66 extends downwardly through tubular member 62 and passes through the driving head 72 of power mechanism 60. Driving head 72 includes a frictional driving mechanism, not shown, capable of linearly actuating rod 66 upwardly and downwardly in tubular member 62. Since the driving head 72 is similar in form to the known mechanisms such as utilized in power operated radio antennas, a detailed description of the precise construction will be omitted.

In order to control the raised and lowered positions of panel 26, power operated mechanism 52 is provided with limit switches 74 and 76 which are mounted in vertically spaced relation on a bracket secured to the body of mechanism 52 (Fig. 6). Flexible rod 66 extends downwardly through driving head 72 and is received in a tubular member 63 having a continuous vertically extending slot 78 formed therein. At its lower end, rod 66 is provided with a horizontal pin 80 which extends outwardly through slot 78. Pin 80 travels up and down in slot 78 as rod 66 is actuated upwardly and downwardly by driving head 72. Consequently, when rod 66 reaches a predetermined extended position, the pin 80 strikes the operating arm of microswitch 74 and deenergizes the circuit causing operation of power mechanism 52 in one direction. Similarly, when the rod 66 is actuated downwardly responsive to operation of power mechanism 52 in the opposite direction, pin 80 travels downwardly in slot 78 and engages the lever arm of microswitch 76, whereupon the circuit causing operation of power mechanism 52 in the opposite direction is deenergized. It will, thus, be seen that by properly vertically spacing the microswitches 74 and 76, the desired limits of angular position of flipper 26 in both the open and closed position may be precisely adjusted.

While but one embodiment of the invention has been shown and described, it is known that other changes and modifications may be made. It is also to be understood that it is not intended to limit the invention to the embodiment shown but only by the scope of the claims which follow.

I claim:

1. In a closed vehicle body having connecting top and side walls, means forming a door opening in said side wall, a portion of said opening extending into said top wall to form a transverse notch therein, a pair of doors hinged to said body and adapted to cooperate in closed position to occupy the area of said opening, one of said doors being manually swingable about a vertical axis and the other of said doors being swingable about an axis parallel with said side wall, power operated linear actuating means providing corresponding synchronous operation of both of said doors, and switch means responsive to manual operation of said one door for energizing said power operated means, said power operated means including a flexible rod having one end thereof engaging said other door.

2. In a closed vehicle body having connecting top and side walls, means forming a door opening in said side wall, a portion of said opening extending into said top wall to form a transverse notch therein, a pair of doors hinged to said body and adapted to cooperate in closed position to occupy the area of said opening, one of said doors being manually swingable about a vertical axis and the other of said doors being swingable about an axis parallel with said side wall, and electrically operated linear actuating means operatively connected to said other door for providing corresponding synchronous operation of both of said doors, and a two-position control switch for said actuating means movable to one position or the other upon opening or closing respectively of said one door, said last mentioned door being counterbalanced to render it substantially self-opening upon operation of said actuating means.

3. In a vehicle body having co-extensive top and side walls, a first door movable to expose a side wall opening, a second door movable to expose a top wall opening, said top wall opening being formed laterally adjacent to and communicating with said side wall opening to provide increased lateral and vertical clearance for passengers entering and alighting from said vehicle, power means, a flexible shaft linearly actuated by said power means, a two-position switch operating by opening and closing said first door to cause swinging movement of said second door in synchronous relation with said first door, and means for automatically deenergizing said power operated means when said second door reaches predetermined limits of angular movement.

References Cited in the file of this patent

UNITED STATES PATENTS

| | | |
|---|---|---|
| 2,141,298 | Heinz | Dec. 27, 1938 |
| 2,408,132 | Weeks | Sept. 24, 1946 |
| 2,499,749 | Hilliard | Mar. 7, 1950 |
| 2,576,816 | Wahlberg | Nov. 27, 1951 |
| 2,689,766 | Blackman | Sept. 21, 1954 |